(12) United States Patent
Liu

(10) Patent No.: US 10,761,388 B2
(45) Date of Patent: Sep. 1, 2020

(54) DISPLAY PANEL AND DISPLAY

(71) Applicant: HKC CORPORATION LIMITED, Shenzhen, Guangdong (CN)

(72) Inventor: Zhongnian Liu, Guangdong (CN)

(73) Assignee: HKC CORPORATION LIMITED, Shenzhen (CN)

( * ) Notice: Subject to any disclaimer, the term of this patent is extended or adjusted under 35 U.S.C. 154(b) by 57 days.

(21) Appl. No.: 16/312,694

(22) PCT Filed: Nov. 9, 2018

(86) PCT No.: PCT/CN2018/114825
§ 371 (c)(1),
(2) Date: Dec. 21, 2018

(87) PCT Pub. No.: WO2020/082438
PCT Pub. Date: Apr. 30, 2020

(65) Prior Publication Data
US 2020/0124930 A1      Apr. 23, 2020

(30) Foreign Application Priority Data

Oct. 22, 2018  (CN) .......................... 2018 1 1230123

(51) Int. Cl.
*G02F 1/1362* (2006.01)
*G09G 3/36* (2006.01)

(52) U.S. Cl.
CPC ..... *G02F 1/136286* (2013.01); *G09G 3/3688* (2013.01); *G02F 2001/13629* (2013.01); *G09G 2300/0426* (2013.01); *G09G 2320/0223* (2013.01)

(58) Field of Classification Search
CPC ............... H01L 27/124; H01L 27/3276; H01L 27/1248; G02F 1/136286; G02F 1/136259; G02F 1/1309
See application file for complete search history.

(56) References Cited

U.S. PATENT DOCUMENTS

| | | | |
|---|---|---|---|
| 2006/0292865 A1* | 12/2006 | Yamazaki | H01L 27/124 438/666 |
| 2009/0085034 A1* | 4/2009 | Choi | H01L 27/124 257/59 |
| 2014/0332867 A1* | 11/2014 | Sakakura | H01L 21/76834 257/288 |
| 2017/0024060 A1* | 1/2017 | Seong | G06F 3/0416 |
| 2019/0198598 A1* | 6/2019 | Lee | G09G 3/20 |

FOREIGN PATENT DOCUMENTS

| | | |
|---|---|---|
| CN | 102661274 A | 9/2012 |
| CN | 105070725 A | 11/2015 |
| CN | 106842741 A | 6/2017 |
| CN | 106847829 A | 6/2017 |
| KR | 20080051196 A | 6/2008 |

OTHER PUBLICATIONS

Yu Zhong, the ISA written comments, Jul. 2019, CN.
Yu Zhong, the International Search Report, dated Jul. 2019. CN.

\* cited by examiner

*Primary Examiner* — Gerald Johnson

(57) ABSTRACT

In some embodiments of the present disclosure, it is provided a display panel and a display. The space between the third wire and the gate line of the display panel is greater than the original thickness of the first insulating layer. Since the capacitance is inversely proportional to the space and the signal delay time is proportional to the capacitance, the signal delay time of the display panel can be reduced.

20 Claims, 2 Drawing Sheets

DISPLAY PANEL AND DISPLAY

CROSS-REFERENCES TO RELATED APPLICATION

This application is the International Application No. PCT/CN2018/114825 for entry into US national phase with an international filing date of Nov. 9, 2018 designating US, now pending, and claims priority to Chinese Patent Application 201811230123.9, filed on Oct. 22, 2018, the content of which is incorporated herein by reference in its entirety.

BACKGROUND

Field of the Invention

The present disclosure relates to the technical field of display devices, and in particular, to a display panel and a display.

Description of related Art

Liquid crystal display (LCD) is the most widely produced and used flat panel display on the market. The panel of the liquid crystal display consists of a printed substrate, a filter, and a liquid crystal layer between the printed substrate and the filter.

With the application of large-sized and high-resolution panels, the resistance and capacitance of the circuit on the printed substrate increase as the size of the printed substrate increases, and the spacing between the gate line and the data line is small, resulting in the capacitance at the intersection of the gate line and the data line being large, which leads to signal transmission delay.

BRIEF SUMMARY OF THE INVENTION

An object of some embodiments of the present disclosure is to provide a display panel which can solve the problem including, but not limited to, the signal transmission delay due to the large capacitance at the intersection of the gate line and the data line.

To solve the above technical problem, the technical solution adopted by an embodiment of the present disclosure is to provide a display panel, comprising:

a substrate;

a gate line arranged on a surface of the substrate;

a first insulating layer arranged on the surface of the substrate and a surface of the gate line;

a data line comprising a first wire, a second wire and a third wire, wherein the first wire and the second wire are arranged on a surface of the first insulating layer, the third wire is intersected with and spaced apart from the gate line, and the first wire and the second wire are respectively located at both sides of an intersection of the gate line and the data line; and a second insulating layer arranged on the surface of the first insulating layer and surfaces of the first wire and the second wire;

wherein the third wire is arranged on a surface of the second insulating layer, and two ends of the third wire respectively pass through the second insulating layer and are electrically connected to the first wire and the second wire.

In an embodiment, the third wire is a conductive glass member.

In an embodiment, a first via hole is defined in the second insulating layer, and one of the two ends of the third wire is inserted into the first via hole and electrically connected to the first wire.

In an embodiment, the first via hole comprises a first lateral groove and a first longitudinal hole which are in communication with each other, one end of the first wire is horizontally inserted into the first lateral groove, the one of the two ends of the third wire is longitudinally inserted into the first longitudinal hole, and the one of the two ends of the third wire completely fills the first longitudinal hole and is electrically connected to the one end of the first wire.

In an embodiment, the first lateral groove comprises a first lateral end and a second lateral end opposing the first lateral end, and the first longitudinal hole is near the second lateral end.

In an embodiment, the second lateral end is arranged obliquely.

In an embodiment, the size of the second lateral end is gradually decreased in the direction from the first lateral end to the second lateral end.

In an embodiment, the one end of the third wire fills the first longitudinal hole and covers a top periphery of the first longitudinal hole.

In an embodiment, the size of the first longitudinal hole is gradually decreased in a direction from the end away from the first wire to the end near the first wire.

In an embodiment, a second via hole is defined in the second insulating layer, and the other end of the third wire is inserted into the second via hole and is electrically connected to the second wire.

In an embodiment, the second via hole comprises a second lateral groove and a second longitudinal hole which are in communication with each other, one end of the second wire is horizontally inserted into the second lateral groove, the other end of the third wire is longitudinally inserted into the second longitudinal hole, and the other end of the third wire completely fills the second longitudinal hole and is electrically connected to the one end of the second wire.

In an embodiment, the second lateral groove has a third lateral end and a fourth lateral end opposing the third lateral end, and the second longitudinal hole is near the fourth lateral end.

In an embodiment, the size of the fourth lateral end is gradually decreased in a direction from the third lateral end to the fourth lateral end.

In an embodiment, the other end of the third wire fills the second longitudinal hole and covers a top circumference of the second longitudinal hole.

In an embodiment, the size of the second longitudinal hole is gradually decreased in a direction from the end away from the second wire to the end near the second wire.

In an embodiment, the first insulating layer is spread on the substrate, and the second insulating layer is spread on the first insulating layer and the first wire and the second wire.

In an embodiment, the display panel has a plurality of the gate lines arranged in parallel with each other and a plurality of the data lines arranged in parallel with each other, and the plurality of the gate lines are perpendicular with the plurality of the data lines.

In an embodiment, the second insulating layer is made of polyvinyl chloride.

In another embodiment of the present disclosure, it is provided a display, comprising a display panel, wherein the display panel comprises:

a substrate;

a gate line arranged on a surface of the substrate;

a first insulating layer arranged on the surface of the substrate and a surface of the gate line;

a data line comprising a first wire, a second wire and a third wire, wherein the first wire and the second wire are arranged on a surface of the first insulating layer, the third wire is intersected with and spaced apart from the gate line, and the first wire and the second wire are respectively located at both sides of an intersection of the gate line and the data line; and a second insulating layer arranged on the surface of the first insulating layer and surfaces of the first wire and the second wire;

wherein the third wire is arranged on a surface of the second insulating layer, and two ends of the third wire respectively pass through the second insulating layer and are electrically connected to the first wire and the second wire.

In yet another embodiment of the present disclosure, it is provided a display, comprising a display panel and a backlight module configured to provide backlighting for the display panel, wherein the display panel comprises:

a substrate;

a gate line arranged on a surface of the substrate;

a first insulating layer arranged on the surface of the substrate and a surface of the gate line;

a data line comprising a first wire, a second wire and a third wire, wherein the first wire and the second wire are arranged on a surface of the first insulating layer, the third wire is intersected with and spaced apart from the gate line, and the first wire and the second wire are respectively located at both sides of an intersection of the gate line and the data line; and a second insulating layer arranged on the surface of the first insulating layer and surfaces of the first wire and the second wire;

wherein the third wire is arranged on a surface of the second insulating layer and is a conductive glass member;

wherein a first via hole is defined in the second insulating layer, the first via hole comprises a first lateral groove and a first longitudinal hole which are in communication with each other, one end of the first wire is horizontally inserted into the first lateral groove, and one end of the third wire is longitudinally inserted into the first longitudinal hole and is electrically connected to the one end of the first wire; and wherein a second via hole opposite to the first via hole is defined in the second insulating layer, the second via hole comprises a second lateral groove and a second longitudinal hole which are in communication with each other, one end of the second wire is horizontally inserted into the second lateral groove, and the other end of the third wire is longitudinally inserted into the second longitudinal hole and is electrically connected to the one end of the second wire.

A further object of an embodiment of the present disclosure is to provide a display panel. The gate line, the first insulating layer, the data line and the second insulating layer 50 are sequentially arranged above the substrate from bottom to top, and the data line is set to be the first wire, the second wire and the third wire, and the first wire is electrically connected to the second wire through the third wire, the data line is therefore able to operate normally. The third wire is arranged at the intersection, thus at the intersection, the distance between the third wire and the gate line equals to the sum of the thickness of the first insulating layer and the thickness of the second insulating layer, that is, the distance between the third wire and the gate line is greater than the thickness of the original first insulating layer. Since the capacitance is inversely proportional to the distance between the third wire and the gate line, that is, as the distance between the third wire and the gate line is larger, the smaller the capacitance between the third wire and the gate line is. The third wire is made of low-resistance conductive glass material. Since the conductive glass can reduce the area of the intersection of the data line and the gate line, the same function of reducing the capacitance at the intersection of the gate line and the data line can be achieved. As the signal delay time is proportional to the capacitance, the signal delay time of the display panel can be reduced and the user experience can be effectively ensured.

BRIEF DESCRIPTION OF THE DRAWINGS

In order to more clearly illustrate the technical solutions in the embodiments of the present disclosure, the drawings used in the embodiments or the prior art description will be briefly described below. It is obvious that the drawings in the following description are only some embodiments of the present disclosure. To those skilled in the art, other drawings may be obtained from these drawings without paying any creative effort.

DESCRIPTION OF THE EMBODIMENTS

The technical solutions in the embodiments of the present disclosure will be clearly described in the following with reference to the accompanying drawings in the embodiments of the present disclosure. It is obvious that the embodiments to be described are just some instead of all embodiments of the present disclosure. All other embodiments obtained by those skilled in the art based on the embodiments of the present disclosure without paying any creative effort should be included within the protection scope of the present disclosure.

The term "comprise" and its variations in the specification, claims and above description of the drawings of the present disclosure are intended to cover non-exclusive inclusions. For example, a process, method or system, product or device including a series of steps or units is not limited to the listed steps or units, but optionally also includes steps or units not listed, or optionally also includes other steps or units inherent to the process, method, product or equipment. Moreover, the terms "first", "second" and "third," etc. are used to distinguish different objects, and are not intended to describe a particular order.

Figure 1:
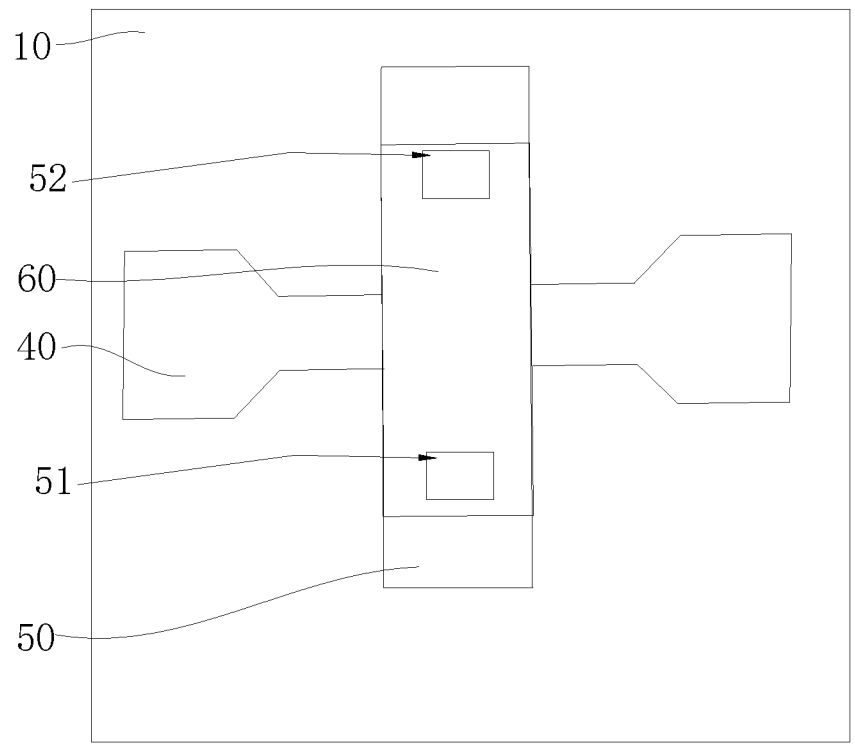
FIG. 1 is a schematic structural view of a display panel according to an embodiment of the present disclosure.
Figure 2:
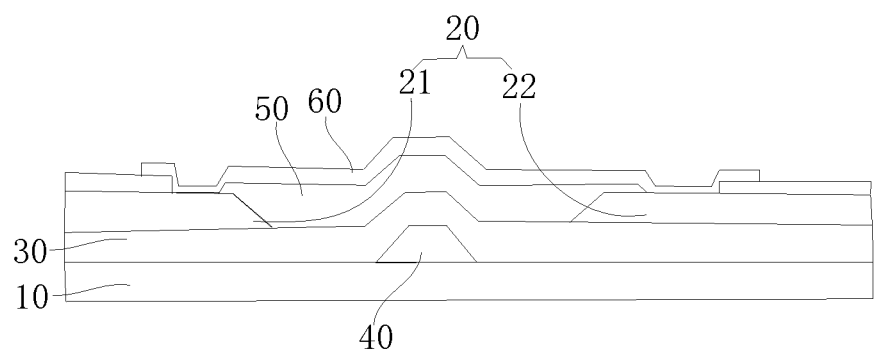
FIG. 2 is a schematic structural view of a display panel according to another embodiment of the present application.
Figure 3:
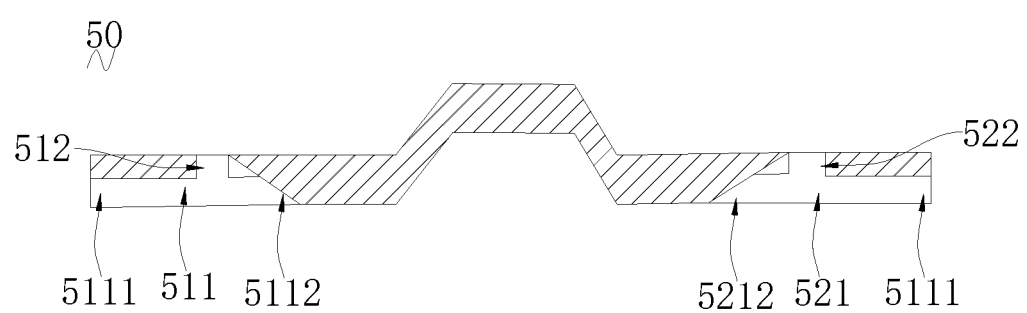
FIG. 3 is a schematic cross-sectional structural view of a second insulating layer according to an embodiment of the present application.

As shown in FIGS. 1 to 3, according to an embodiment of the present disclosure, it is provided a display panel including a substrate 10, and a gate line 40, a first insulating layer 30, a data line 20 and a second insulating layer 50 sequentially arranged above the substrate 10 from bottom to top. The data line 20 includes a first wire 21, a second wire 22 and a third wire 60. The third wire 60 is intersected with and spaced apart from the gate line 40 at the intersection. The first wire 21 and the second wire 22 respectively located at both sides of the intersection, and the third wire 60 is arranged on the second insulating layer 50 at the intersection. Two ends of the third wire 60 respectively pass through the second insulating layer 50 and are electrically connected to the first wire 21 and the second wire 22.

In the display panel according to an embodiment of the present disclosure, the gate line 40, the first insulating layer 30, the data line 20, and the second insulating layer 50 are sequentially arranged above the substrate 10 from the bottom to the top, and the data line 20 is set to be the first wire 21, the second wire 22 and the third wire 60, and the first wire 21 is electrically connected to the second wire 22 through the third wire 60, the data line 20 is therefore able to operate normally. The third wire 60 is arranged at the intersection, thus at the intersection, the distance between the third wire 60 and the gate line 40 equals to the sum of the thickness of the first insulating layer 30 and the thickness of the second insulating layer 50, that is, the distance between the third wire 60 and the gate line 40 is greater than the thickness of the original first insulating layer 30. Since the capacitance is inversely proportional to the distance between the third wire 60 and the gate line 40, that is, as the distance between the third wire 60 and the gate line 40 is larger, the smaller the capacitance between the third wire 60 and the gate line 40 is, and the signal delay time is proportional to the capacitance, therefore the signal delay time of the display panel can be reduced and the user experience can be effectively ensured.

Optionally, the third wire 60 may be a conductive glass member. The third wire 60 is made of low-resistance conductive glass material. Since the resistance of the conductive glass is low, the width of the third wire can be designed to be smaller, thereby reducing the area of the intersection of the data line 20 and the gate line 40. Thus the same function of reducing the capacitance at the intersection of the gate line 40 and the data line 20 can be achieved.

In one embodiment, referring to FIGS. 2 to 3, a first via hole 51 is defined in the second insulating layer 50. One end of the third wire 60 is inserted into the first via hole 51 and electrically connected to the first wire 21. The first wire 21 is located below the second insulating layer 50 by opening the first via hole 51, and one end of the third wire 60 is electrically connected to the first wire 21 through the second insulating layer 50 having the first via hole 51, so that The third wire 60 can be electrically conductive, which can make the data line work normally, and the user experience is guaranteed.

In an embodiment, referring to FIGS. 2 to 3, the first via hole 51 includes a first lateral groove 511 and a first longitudinal hole 512. One end of the first wire 21 is horizontally inserted into the first lateral groove 511. One end of the third wire 60 is longitudinally inserted into the first longitudinal hole 512, and the one end of the third wire 60 completely fills the first longitudinal hole 512 and is electrically connected to the one end of the first wire 21. The first lateral groove 511 is formed, the first wire 21 is horizontally inserted into the first lateral groove 511 and is pressed by the second insulating layer 50 between the first insulating layer 30 and the second insulating layer 50, so that the first wire 21 can be stably fixed in the first lateral groove 511. And by forming the first longitudinal hole 512 in communication with the first lateral groove 511, the one end of the third wire 60 can be inserted into the first longitudinal hole 512 and connected to the first wire 21. Further, the one end of the third wire 60 is engaged in the first longitudinal hole 512, so that the third wire 60 is fixed in the first longitudinal hole 512, therefore the connection between the first wire 21 and the third wire 60 is relatively stable. In addition, the one end of the third wire 60 completely fills the first longitudinal hole 512, so that the first wire 21 can be completely protected under the third wire 60 and the second insulating layer 50, preventing the first wire 21 from being easily corrosion due to exposure to the air.

In an embodiment, referring to FIGS. 1 to 3, the first lateral groove 511 includes a first lateral end 5111 and a second lateral end 5112 opposing the first lateral end 5111, and the first longitudinal hole 512 is near the second lateral end 5112. By arranging the first longitudinal hole 512 near the second lateral end 5112, and arranging the second lateral end 5112 near the intersection of the gate line 40 and the third wire 60, only a small part of the third wire 60 is required for being inserted into the first longitudinal hole 512, therefore the raw material of the third wire 60 can be saved and the production cost can be reduced.

In an embodiment, referring to FIGS. 1-3, the second lateral end 5112 is arranged obliquely. Since the first wire 21 is inserted into the first lateral groove 511, by configuring one side of the second lateral end 5112 to be inclined, the first lateral groove 511 can be engaged with the first wire 21 at the second lateral end 5112, so that the first wire 21 can be inserted firmly.

In an embodiment, referring to FIGS. 1 to 3, the size of the second lateral end 5112 is gradually decreased in the direction from the first lateral end 5111 to the second lateral end 5112. By configuring the second lateral end 5112 to gradually change in size, the first wire 21 inserted into the first lateral groove 511 can be pressed by the second lateral end 5112, so that the first wire 21 can be firmly fixed.

In an embodiment, referring to FIGS. 1 to 3, one end of the third wire 60 fills the first longitudinal hole 512 and covers a top periphery of the first longitudinal hole 512. After the third wire 60 completely fills the first longitudinal hole 512, fine dross may still enter the first longitudinal hole 512, thereby affecting the normal connection between the first wire 21 and the third wire 60. By configuring one end of the third wire 60 to cover the top periphery of the first longitudinal hole 512, fine dross can be prevented from entering the first longitudinal hole 512, thereby ensuring the normal connection between the first wire 21 and the third wire 60.

In an embodiment, referring to FIGS. 1 to 3, the size of the first longitudinal hole 512 is gradually decreased in the direction from the end away from the first wire 21 to the end near the first wire 21. When the third wire 60 is disposed in the first longitudinal hole 512, the third lead 60 may slide off from the first longitudinal hole 512. By configuring the size of the first longitudinal hole 512 to be gradually decreased in the direction from the end away from the first wire 21 to the end near the first wire 21, the contact area between the third wire 60 and the first longitudinal hole 512 can be increased, thereby increasing the frictional force between them and preventing the third wire 60 from sliding off from the first longitudinal hole 512.

In an embodiment, referring to FIGS. 1 to 3, a second via hole 52 opposite to the first via hole 51 is defined in the second insulating layer 50. The other end of the third wire 60 is inserted into the second via hole 52 and is connected to the second wire 22. The second via hole 52 is formed, the second wire 22 is located below the second insulating layer 50, and the other end of the third wire 60 passes through the second via hole 52 in the second insulating layer and is electrically connected to the second wire 22, therefore, one end of the third wire 60 is electrically connected to the first wire 21 and the other end of the third wire is electrically connected to the second wire 22. Thus, the third wire 60 can serve to conduct electricity, thereby ensuring user's use.

In an embodiment, referring to FIGS. 2 to 3, the second via hole 51 includes a second lateral groove 521 and a second longitudinal hole 522 which are in communication with each other. One end of the second wire 22 is horizontally inserted into the second lateral groove 521. The other end of the third wire 60 is longitudinally inserted into the second longitudinal hole 522, and the other end of the third wire 60 completely fills the second longitudinal hole 512 and is electrically connected to the one end of the second wire 22. The second lateral groove 521 is formed, the second wire 22 is horizontally inserted into the second lateral groove 521 and is pressed by the second insulating layer 50 between the first insulating layer 30 and the second insulating layer 50, so that the second wire 21 can be stably fixed in the second lateral groove 521. And by forming the second longitudinal hole 522 in communication with the second lateral groove 521, the other end of the third wire 60 can be inserted into the second longitudinal hole 522 and connected to the second wire 22. Further, the other end of the third wire 60 is engaged in the second longitudinal hole 522, so that the third wire 60 is fixed in the second longitudinal hole 522, therefore the connection between the second wire 22 and the third wire 60 is relatively stable. In addition, the other end of the third wire 60 completely fills the second longitudinal hole 522, so that the second wire 22 can be completely protected under the third wire 60 and the second insulating layer 50, preventing the second wire 22 from being easily corrosion due to exposure to the air.

In an embodiment, referring to FIGS. 1 to 3, the second lateral groove 521 includes a third lateral end 5211 and a fourth lateral end 5212 opposing the third lateral end 5211, and the second longitudinal hole 522 is near the fourth lateral end 5212. By arranging the second longitudinal hole 512 near the fourth lateral end 5212, and arranging the fourth lateral end 5212 near the intersection of the gate line 40 and the third wire 60, therefore the raw material of the third wire 60 which is inserted in the second longitudinal hole 522 can be saved and the production cost can be reduced.

In an embodiment, referring to FIGS. 1-3, the fourth lateral end 5212 is arranged obliquely. Since the second wire 22 is inserted into the second lateral groove 521, by configuring one side of the fourth lateral end 5212 to be inclined, the second lateral groove 521 can be engaged with the second wire 22 at the fourth lateral end 5212, so that the second wire 22 can be inserted firmly.

In an embodiment, referring to FIGS. 1 to 3, the size of the fourth lateral end 5212 is gradually decreased in the direction from the third lateral end 5211 to the fourth lateral end 5212. By configuring the fourth lateral end 5212 to gradually change in size, the second wire 22 inserted into the second lateral groove 521 can be pressed by the fourth lateral end 5212, so that the second wire 22 can be firmly fixed.

In an embodiment, referring to FIGS. 1 to 3, the other end of the third wire 60 fills the second longitudinal hole 522 and covers the top periphery of the second longitudinal hole 522. After the third wire 60 completely fills the third longitudinal hole 522, fine dross may still enter the second longitudinal hole 522, thereby affecting the normal connection between the second wire 22 and the third wire 60. By configuring the other end of the third wire 60 to cover the top periphery of the second longitudinal hole 522, fine dross can be prevented from entering the second longitudinal hole 522, thereby ensuring the normal connection between the second wire 22 and the third wire 60.

In an embodiment, referring to FIGS. 1 to 3, the size of the second longitudinal hole 522 is gradually decreased in the direction from the end away from the second wire 22 to the end near the second wire 22. When the third wire 60 is disposed in the second longitudinal hole 522, the third lead 60 may slide off from the second longitudinal hole 512. By configuring the size of the second longitudinal hole 522 to be gradually decreased in the direction from the end away from the second wire 22 to the end near the second wire 22, the contact area between the third wire 60 and the second longitudinal hole 522 can be increased, thereby increasing the frictional force between them and preventing the third wire 60 from sliding off from the second longitudinal hole 522.

In one embodiment, the second insulating layer 50 is made of polyvinyl chloride. Since polyvinyl chloride has high mechanical strength and a high melting point and the production cost is low, the production cost can be reduced with ensuring the performance of the second insulating layer 50.

In one embodiment, the display panel has a plurality of gate lines 40 arranged in parallel with each other and a plurality of data lines 20 arranged in parallel with each other, and the plurality of gate lines 40 are perpendicular to the plurality of data lines 20. The number of the gate lines 40 and the data lines 20 are plural, such that the number of the intersections of the gate lines 40 and the data lines 20 is plural. And by configuring the gate lines 40 to be perpendicular to the data lines 20, when using the third line 60 to connect the first wire 21 with the second wire 22, the raw material can be saved compared with the gate lines 40 and the data lines 20 being arranged obliquely.

In an embodiment, the first insulating layer 30 is spread on the substrate 10, and the second insulating layer 50 is spread on the first insulating layer 30 and first wire and the second wire of the data line. By spreading the first insulating layer 30 on the substrate 10, the display panel can be protected. And by arranging the second insulating layer 50 on the first insulating layer 30, the display panel can be further protected by the second insulating layer 50.

In another embodiment of the present disclosure, it is provided a display including a display panel. The display panel includes a substrate 10, and a gate line 40, a first insulating layer 30, a data line 20 and a second insulating layer 50 sequentially arranged above the substrate 10 from bottom to top. The data line 20 includes a first wire 21, a second wire 22 and a third wire 60. The third wire 60 is intersected with and spaced apart from the gate line 40 at the intersection. The first wire 21 and the second wire 22 respectively located at both sides of the intersection, and the third wire 60 is arranged on the second insulating layer 50 at the intersection. Two ends of the third wire 60 respectively pass through the second insulating layer 50 and are electrically connected to the first wire 21 and the second wire 22. The third wire 60 is arranged at the intersection, thus at the intersection, the distance between the third wire 60 and the gate line 40 equals to the sum of the thickness of the first insulating layer 30 and the thickness of the second insulating layer 50, that is, the distance between the third wire 60 and the gate line 40 is greater than the thickness of the original first insulating layer 30. Since the capacitance is inversely proportional to the distance between the third wire 60 and the gate line 40, that is, as the distance between the third wire 60 and the gate line 40 is larger, the smaller the capacitance between the third wire 60 and the gate line 40 is. The third wire 60 is made of low-resistance conductive glass material. Since the conductive glass can reduce the area of the intersection of the data line 20 and the gate line 40, the same function of reducing the capacitance at the intersection of the gate line 40 and the data line 20 can be achieved. As the signal delay time is proportional to the capacitance, the signal delay time of the display can be reduced and the user experience can be effectively ensured.

In yet another embodiment of the present disclosure, it is provided a display including a display panel and a backlight module configured to provide backlighting for the display panel. The display panel includes a substrate 10, and a gate line 40, a first insulating layer 30, a data line 20 and a second insulating layer 50 sequentially arranged above the substrate 10 from bottom to top. The data line 20 includes a first wire 21, a second wire 22 and a third wire 60. The third wire 60 is intersected with and spaced apart from the gate line 40 at the intersection. The first wire 21 and the second wire 22 respectively located at both sides of the intersection, and the third wire 60 is arranged on the second insulating layer 50 at the intersection. Two ends of the third wire 60 respectively pass through the second insulating layer 50 and are electrically connected to the first wire 21 and the second wire 22. The third wire 60 is a conductive glass member. A first via hole 51 is defined in the second insulating layer 50, the first via hole 51 includes a first lateral groove 511 and a first longitudinal hole 512 which are in communication with each other, one end of the first wire 21 is horizontally inserted into the first lateral groove 511, and one end of the third wire 60 is longitudinally inserted into the first longitudinal hole 512 and is electrically connected to the one end of the first wire 21. A second via hole 52 opposite to the first via hole 51 is defined in the second insulating layer 50, the second via hole 52 includes a second lateral groove 521 and a second longitudinal hole 522 which are in communication with each other, one end of the second wire 22 is horizontally inserted into the second lateral groove 521, and the other end of the third wire 60 is longitudinally inserted into the second longitudinal hole 522 and is electrically connected to the one end of the second wire 22.

The display according to some embodiments of the present disclosure has the beneficial effects that the display includes a backlight module and a display panel. The gate line 40, the first insulating layer 30, the data line 20 and the second insulating layer 50 are sequentially arranged above the substrate 10 from bottom to top, and the data line 20 is set to be the first wire 21, the second wire 22 and the third wire 60, and the first wire 21 is electrically connected to the second wire 22 through the third wire 60, the data line 20 is therefore able to operate normally. The third wire 60 is arranged at the intersection, thus at the intersection, the distance between the third wire 60 and the gate line 40 equals to the sum of the thickness of the first insulating layer 30 and the thickness of the second insulating layer 50, that is, the distance between the third wire 60 and the gate line 40 is greater than the thickness of the original first insulating layer 30. Since the capacitance is inversely proportional to the distance between the third wire 60 and the gate line 40, that is, as the distance between the third wire 60 and the gate line 40 is larger, the smaller the capacitance between the third wire 60 and the gate line 40 is. The third wire 60 is made of low-resistance conductive glass material. Since the conductive glass can reduce the area of the intersection of the data line 20 and the gate line 40, the same function of reducing the capacitance at the intersection of the gate line 40 and the data line 20 can be achieved. As the signal delay time is proportional to the capacitance, the signal delay time of the display panel can be reduced and the user experience can be effectively ensured. By forming the first longitudinal hole 512 in communication with the first lateral groove 511, the one end of the third wire 60 can be inserted into the first longitudinal hole 512 and connected to the first wire 21. Further, the one end of the third wire 60 is engaged in the first longitudinal hole 512, so that the third wire 60 is fixed in the first longitudinal hole 512, therefore the connection between the first wire 21 and the third wire 60 is relatively stable. By forming the second longitudinal hole 522 in communication with the second lateral groove 521, the other end of the third wire 60 can be inserted into the second longitudinal hole 522 and connected to the second wire 22. Further, the other end of the third wire 60 is engaged in the second longitudinal hole 522, so that the third wire 60 is fixed in the second longitudinal hole 522, therefore the connection between the second wire 22 and the third wire 60 is relatively stable. Thus, the signal delay time of the display can be reduced and the user experience can be effectively ensured.

The above description is only some optional embodiments of the present disclosure, and is not intended to limit the present disclosure. Any modifications, equivalent substitutions and improvements made within the spirit and principles of the present disclosure should be included in the protection scope of the present disclosure.

What is claimed is:

1. A display panel, comprising:
   a substrate;
   a gate line arranged on a surface of the substrate;
   a first insulating layer arranged on the surface of the substrate and a surface of the gate line;
   a data line comprising a first wire, a second wire and a third wire, wherein the first wire and the second wire are arranged on a surface of the first insulating layer, the third wire is intersected with and spaced apart from the gate line, and the first wire and the second wire are respectively located at both sides of an intersection of the gate line and the data line; and
   a second insulating layer arranged on the surface of the first insulating layer and surfaces of the first wire and the second wire;
   wherein the third wire is arranged on a surface of the second insulating layer, and two ends of the third wire respectively pass through the second insulating layer and are electrically connected to the first wire and the second wire.

2. The display panel of claim 1, wherein the third wire is a conductive glass member.

3. The display panel of claim 1, wherein a first via hole is defined in the second insulating layer, and one of the two ends of the third wire is inserted into the first via hole and electrically connected to the first wire.

4. The display panel of claim 3, wherein the first via hole comprises a first lateral groove and a first longitudinal hole which are in communication with each other, one end of the first wire is horizontally inserted into the first lateral groove, the one of the two ends of the third wire is longitudinally inserted into the first longitudinal hole, and the one of the two ends of the third wire completely fills the first longitudinal hole and is electrically connected to the one end of the first wire.

5. The display panel of claim 4, wherein the first lateral groove comprises a first lateral end and a second lateral end opposing the first lateral end, and the first longitudinal hole is near the second lateral end.

6. The display panel of claim 5, wherein the second lateral end is arranged obliquely.

7. The display panel of claim 6, wherein the size of the second lateral end is gradually decreased in the direction from the first lateral end to the second lateral end.

8. The display panel of claim 4, wherein the one end of the third wire fills the first longitudinal hole and covers a top periphery of the first longitudinal hole.

9. The display panel of claim 4, wherein the size of the first longitudinal hole is gradually decreased in a direction from the end away from the first wire to the end near the first wire.

10. The display panel of claim 3, wherein a second via hole is defined in the second insulating layer, and the other end of the third wire is inserted into the second via hole and is electrically connected to the second wire.

11. The display panel of claim 10, wherein the second via hole comprises a second lateral groove and a second longitudinal hole which are in communication with each other, one end of the second wire is horizontally inserted into the second lateral groove, the other end of the third wire is longitudinally inserted into the second longitudinal hole, and the other end of the third wire completely fills the second longitudinal hole and is electrically connected to the one end of the second wire.

12. The display panel of claim 11, wherein the second lateral groove has a third lateral end and a fourth lateral end opposing the third lateral end, and the second longitudinal hole is near the fourth lateral end.

13. The display panel of claim 12, wherein the size of the fourth lateral end is gradually decreased in a direction from the third lateral end to the fourth lateral end.

14. The display panel of claim 13, wherein the other end of the third wire fills the second longitudinal hole and covers a top circumference of the second longitudinal hole.

15. The display panel of claim 10, wherein the size of the second longitudinal hole is gradually decreased in a direction from the end away from the second wire to the end near the second wire.

16. The display panel of claim 1, wherein the first insulating layer is spread on the substrate, and the second insulating layer is spread on the first insulating layer and the first wire and the second wire.

17. The display panel of claim 1, wherein the display panel has a plurality of the gate lines arranged in parallel with each other and a plurality of the data lines arranged in parallel with each other, and the plurality of the gate lines are perpendicular with the plurality of the data lines.

18. The display panel of claim 1, wherein the second insulating layer is made of polyvinyl chloride.

19. A display, comprising a display panel, wherein the display panel comprises:
a substrate;
a gate line arranged on a surface of the substrate;
a first insulating layer arranged on the surface of the substrate and a surface of the gate line;
a data line comprising a first wire, a second wire and a third wire, wherein the first wire and the second wire are arranged on a surface of the first insulating layer, the third wire is intersected with and spaced apart from the gate line, and the first wire and the second wire are respectively located at both sides of an intersection of the gate line and the data line; and
a second insulating layer arranged on the surface of the first insulating layer and surfaces of the first wire and the second wire;
wherein the third wire is arranged on a surface of the second insulating layer, and two ends of the third wire respectively pass through the second insulating layer and are electrically connected to the first wire and the second wire.

20. A display, comprising a display panel and a backlight module configured to provide backlighting for the display panel, wherein the display panel comprises:
a substrate;
a gate line arranged on a surface of the substrate;
a first insulating layer arranged on the surface of the substrate and a surface of the gate line;
a data line comprising a first wire, a second wire and a third wire, wherein the first wire and the second wire are arranged on a surface of the first insulating layer, the third wire is intersected with and spaced apart from the gate line, and the first wire and the second wire are respectively located at both sides of an intersection of the gate line and the data line; and
a second insulating layer arranged on the surface of the first insulating layer and surfaces of the first wire and the second wire;
wherein the third wire is arranged on a surface of the second insulating layer and is a conductive glass member;
wherein a first via hole is defined in the second insulating layer, the first via hole comprises a first lateral groove and a first longitudinal hole which are in communication with each other, one end of the first wire is horizontally inserted into the first lateral groove, and one end of the third wire is longitudinally inserted into the first longitudinal hole and is electrically connected to the one end of the first wire; and
wherein a second via hole opposite to the first via hole is defined in the second insulating layer, the second via hole comprises a second lateral groove and a second longitudinal hole which are in communication with each other, one end of the second wire is horizontally inserted into the second lateral groove, and the other end of the third wire is longitudinally inserted into the second longitudinal hole and is electrically connected to the one end of the second wire.

* * * * *